United States Patent
Song et al.

(10) Patent No.: US 12,510,451 B2
(45) Date of Patent: Dec. 30, 2025

(54) METHOD AND APPARATUS FOR CONDUCTING SHEAR TESTS ON INTERCONNECT BONDS

(71) Applicant: ASMPT Singapore Pte. Ltd., Singapore (SG)

(72) Inventors: Keng Yew Song, Singapore (SG); Zui Hong Lee, Singapore (SG); Jian Min Chen, Chengdu (CN); Mow Huat Goh, Singapore (SG); Kien Kia Tan, Singapore (SG)

(73) Assignee: ASMPT Singapore Pte. Ltd., Singapore (SG)

( * ) Notice: Subject to any disclaimer, the term of this patent is extended or adjusted under 35 U.S.C. 154(b) by 327 days.

(21) Appl. No.: 18/137,484

(22) Filed: Apr. 21, 2023

(65) Prior Publication Data
US 2023/0341305 A1 Oct. 26, 2023

(30) Foreign Application Priority Data
Apr. 21, 2022 (CN) .......................... 202210423284.X

(51) Int. Cl.
*G01N 3/24* (2006.01)
*G06T 7/00* (2017.01)
*G06T 7/246* (2017.01)
*G06T 7/60* (2017.01)

(52) U.S. Cl.
CPC .............. *G01N 3/24* (2013.01); *G06T 7/0004* (2013.01); *G06T 7/246* (2017.01); *G06T 7/60* (2013.01); *G06T 2207/30108* (2013.01)

(58) Field of Classification Search
CPC ...................................................... G01N 3/24
See application file for complete search history.

(56) References Cited

U.S. PATENT DOCUMENTS

| | | | |
|---|---|---|---|
| 6,324,916 B1 * | 12/2001 | Jessop | G01N 19/04 73/842 |
| 6,341,530 B1 * | 1/2002 | Sykes | G01N 3/00 73/842 |
| 2003/0010134 A1 * | 1/2003 | Polega | G01N 3/24 73/842 |
| 2004/0103726 A1 * | 6/2004 | Cox | G01N 3/24 73/842 |
| 2005/0109117 A1 * | 5/2005 | Jian | G01N 3/20 73/827 |
| 2011/0214510 A1 * | 9/2011 | Lilley | G01N 19/04 73/841 |
| 2014/0103096 A1 * | 4/2014 | Zhang | H01L 22/12 228/104 |
| 2014/0174192 A1 * | 6/2014 | Shine, Jr. | G01N 33/383 73/803 |

(Continued)

*Primary Examiner* — Eric S. McCall
(74) *Attorney, Agent, or Firm* — OSTROLENK FABER LLP

(57) ABSTRACT

A shear test is conducted on an interconnect bond formed on a surface of an electronic device by first determining a profile of the surface, and based on the determined profile, determining a shearing path which is at a substantially constant distance from the profile of the surface for a shear test tool to conduct the shear test on the interconnect bond. The shear test tool is then guided to move along the determined shearing path to measure a shear force of the interconnect bond.

22 Claims, 5 Drawing Sheets

(56) References Cited

U.S. PATENT DOCUMENTS

| | | | |
|---|---|---|---|
| 2015/0114131 A1* | 4/2015 | Cha | G01N 3/24 |
| | | | 73/842 |
| 2021/0229371 A1* | 7/2021 | Hoeflaak | G01N 3/04 |
| 2023/0137302 A1* | 5/2023 | Song | G01N 3/62 |
| | | | 73/1.01 |
| 2024/0210293 A1* | 6/2024 | Ji | H01M 10/482 |

\* cited by examiner

METHOD AND APPARATUS FOR CONDUCTING SHEAR TESTS ON INTERCONNECT BONDS

FIELD OF THE INVENTION

The invention generally relates to shear tests conducted on interconnect bonds formed on electronic devices, such as wire bonds or solder balls bonded on electronic devices, and more specifically to a shear test conducted on an interconnect bond with increased accuracy.

BACKGROUND

During semiconductor assembly and packaging, shear tests are performed to evaluate the quality of interconnect bonds formed on electronic devices, e.g., ball bonds and wedge bonds formed from bonding wire, so as to determine whether the bond strength of the interconnect bonds is sufficient and/or whether bonding parameters need to be modified.

In a conventional shear test on an interconnect bond, a shear test tool is first moved along a vertical direction until a tip of the shear test tool is located at a predetermined shear height above a surface on which the interconnect bond is formed, and then the shear test tool is moved along a horizontal direction to contact the interconnect bond and measure a shear force acting on the interconnect bond so as to determine its shear or bond strength. In this test, the surface on which the interconnect bond is formed is assumed to be parallel to a horizontal plane. However, in actual application, the surfaces on which interconnect bonds are formed may have different degrees of inclination and/or deformation relative to the horizontal plane. As such, if the shear test is still conducted using the conventional approach mentioned above, the bond strength of the interconnect bonds cannot be accurately measured due to the inclination and/or unevenness of the surface. Such inaccuracy resulting from a non-optimized travel path of a shear test tool has not been recognized by the prior art.

It would therefore be beneficial to provide a solution for conducting shear tests which can avoid the aforesaid shortcoming faced by conventional shear tests.

SUMMARY OF THE INVENTION

It is thus an object of the invention to seek to provide an improved method and apparatus for conducting a shear test to obtain more accurate test results. With the improved shear test method, a shear test tool is moved along a shearing path which is determined based on a degree of inclination and/or warpage of the surface on which the interconnect bond is formed.

According to a first aspect of the present invention, there is provided a method for conducting a shear test on an interconnect bond formed on a surface of an electronic device. The method comprises: determining a profile of the surface; determining a shearing path which is at a substantially constant distance from the profile of the surface for a shear test tool to conduct the shear test on the interconnect bond based on the determined profile of the surface; and guiding the shear test tool to move along the determined shearing path to measure a shear force of the interconnect bond. In some embodiments, if the surface profile is flat but inclined, the determined shearing path has substantially the same degree of inclination as the surface profile. In other embodiments, if the surface is warped, the determined shearing path would substantially follow the warpage profile of the surface.

According to a second aspect of the present invention, there is provided an apparatus for conducting a shear test on an interconnect bond formed on a surface of an electronic device. The apparatus includes: a measuring system configured and operative to determine a profile of the surface on which the interconnect bond is formed and to determine a shearing path which is at a substantially constant distance from the profile of the surface for a shear test tool to conduct the shear test on the interconnect bond based on the determined profile of the surface, and a guiding system configured and operative to guide the shear test tool to move along the determined shearing path to measure a shear force of the interconnect bond.

With the method and apparatus for conducting a shear test in the present invention, the shearing path for a shear test tool to conduct a shear test on an interconnect bond is determined based on a profile of the surface on which the interconnect bond is formed so that the determined shearing path is at a substantially constant distance from the profile of the surface on which the interconnect bond is formed. As such, when the shear test tool is guided to move along the determined shearing path to conduct the shear test, a more accurate bond strength of the interconnect bond can be measured.

These and other features, aspects, and advantages will become better understood with regard to the description section, appended claims, and accompanying drawings.

BRIEF DESCRIPTION OF THE DRAWINGS

Embodiments of the present invention will now be described, by way of example only, with reference to the accompanying drawings, in which.

In the drawings, like parts are denoted by like reference numerals.

DETAILED DESCRIPTION OF THE PREFERRED EMBODIMENTS OF THE INVENTION

Figure 1A:
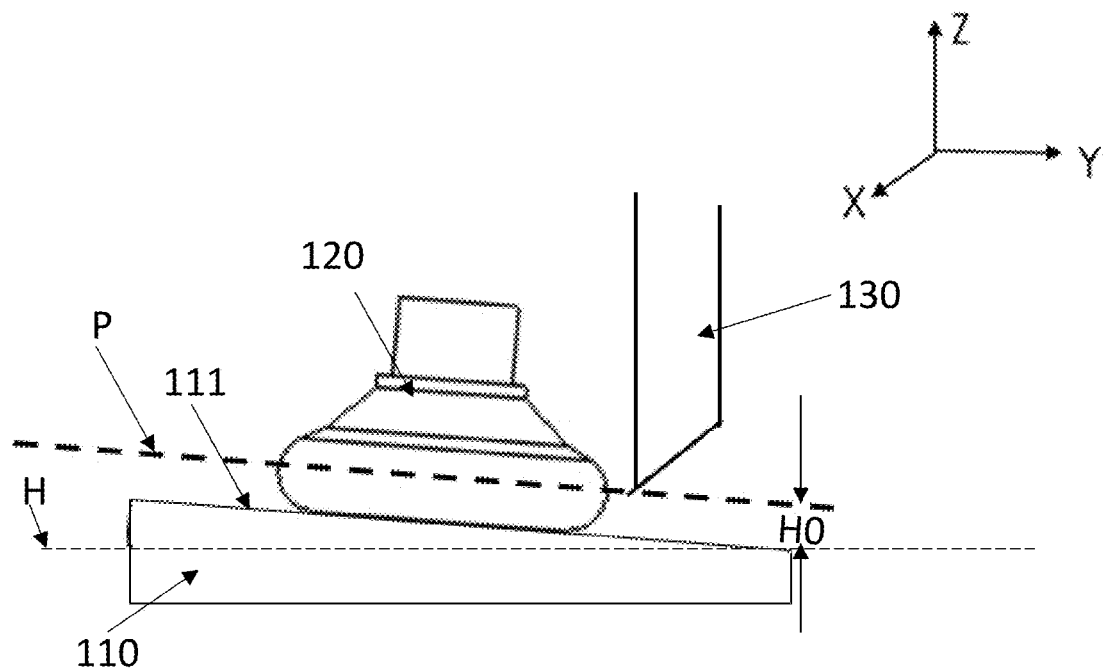
FIG. 1A is a schematic side view of a flat surface of an electronic device on which an interconnect bond is formed.

FIG. 1A is a schematic side view of a flat surface 111 of an electronic device 110 on which an interconnect bond 120 is formed. As shown in FIG. 1A, the flat surface 111 is inclined relative to a horizontal plane H, i.e., an XY plane. Here, the interconnect bond 120 is a ball bond which is provided for illustrative purposes only, and does not limit the scope of the invention. A shear test tool 130 is positioned at a height H0 over the flat surface 111, and an optimal shearing path P that is substantially parallel to the flat surface 111, i.e., the shearing path P has substantially the same degree of inclination as the profile of the flat surface 111, is also illustrated.

Various methods for conducting a shear test on the interconnect bond 120 are provided in various embodiments of the invention. In these embodiments, a degree of inclination of the flat surface 111 relative to the horizontal plane H is determined in order to determine the shearing path P that is at a substantially constant distance from the profile of the flat surface 111. Where the shearing path P is a straight line that is substantially parallel to the flat surface 111 for conducting the shear test so as to avoid the problems encountered by conventional shear tests.

Figure 1B:
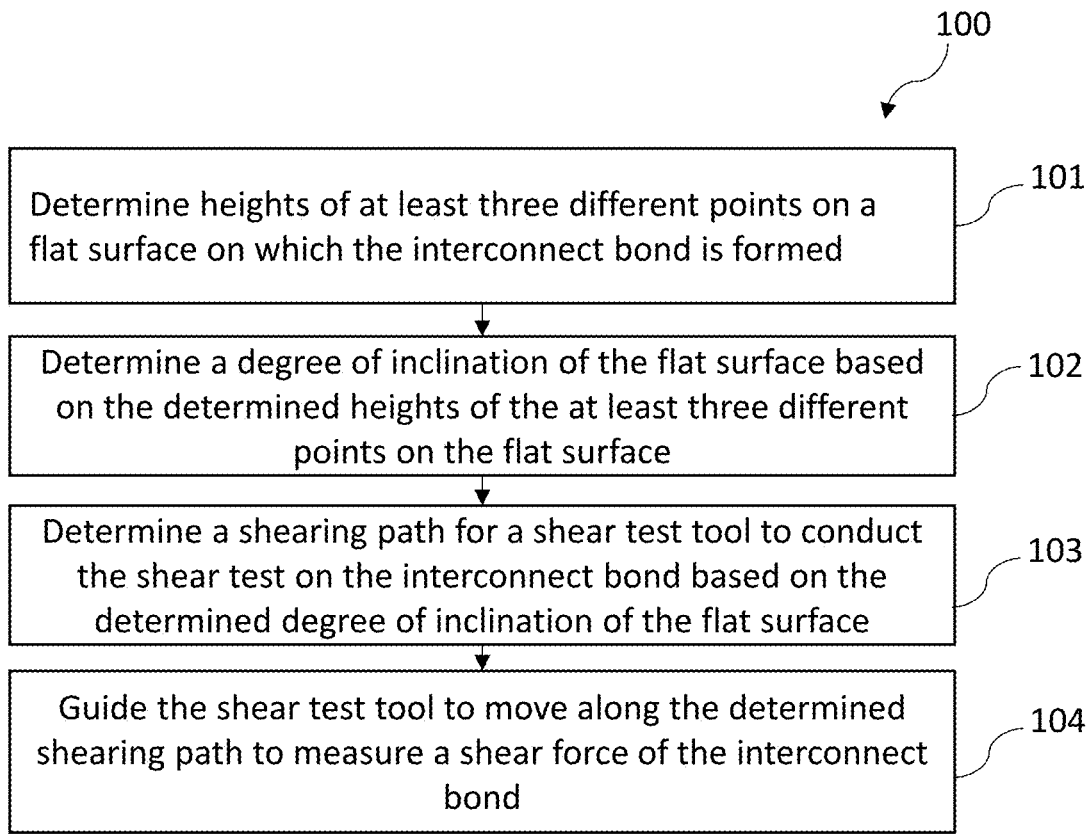
FIG. 1B is a flow chart illustrating a method for conducting a shear test on the interconnect bond formed on the flat surface according to certain embodiments of the invention.

FIG. 1B is a flow chart illustrating a method 100 for conducting a shear test on the interconnect bond 120 formed on the flat surface 111 according to certain embodiments of the invention.

At Step 101, heights of at least three different points on the flat surface 111 are determined.

Figure 1C:
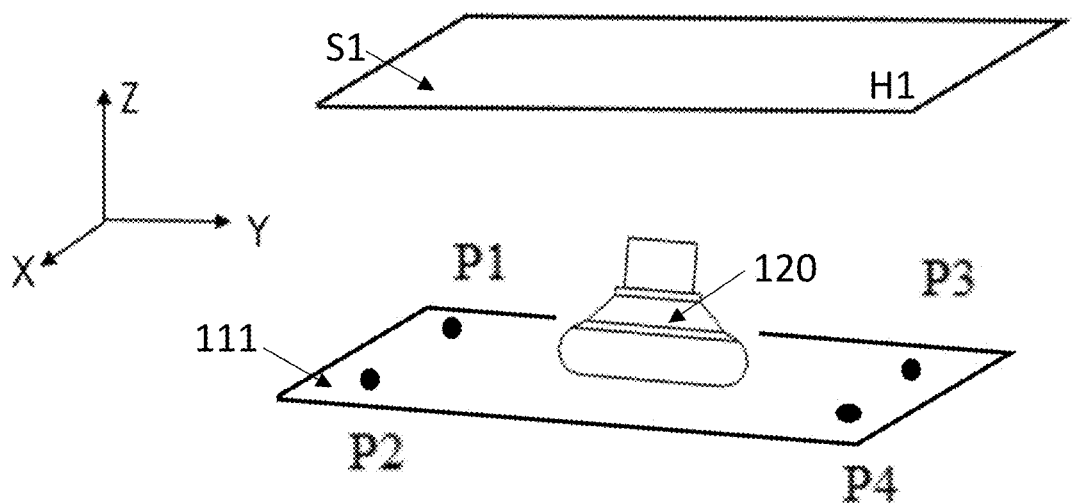
FIG. 1C is a perspective view of the flat surface as shown in FIG. 1A on which the interconnect bond is formed.

FIG. 1C is a perspective view of the flat surface 111 on which the interconnect bond 120 is formed. As shown in FIG. 1C, four different points P1, P2, P3 and P4 that may be measured are indicated on the flat surface 111. The at least three different points on the flat surface 111 may be selected from any of the four points P1, P2, P3 and P4.

At Step 102, a degree of inclination of the flat surface 111 is determined based on the heights of the at least three points on the flat surface 111.

Once the heights of the at least three different points on the flat surface 111 are determined, the degree of inclination of the flat surface 111 may be determined based on the three-dimensional coordinate values of the at least three different points, e.g., the three-dimensional coordinate values of the points P1, P2, and P3 in a three-dimensional Cartesian coordinate system (x1, y1, z1), (x2, y2, z2) and (x3, y3, z3). Specifically, the degree of inclination of the flat surface 111 can be defined by three parameters A, B and C in the equation (1) below, and the values of A, B and C can be calculated based on the values of the coordinates of the three points P1, P2 and P3.

$$Z=Ax+By+C \quad (1)$$

At Step 103, a shearing path P for the shear test tool 130 to conduct the shear test on the interconnect bond 120 is determined based on the determined degree of inclination of the flat surface 111. As shown in FIG. 1A, the shearing path P is substantially parallel to the profile of the flat surface 111. In certain embodiments of the invention, before determining the shearing path for the shear test tool 130 to conduct shear test on the interconnect bond 120, the method may further include: the shear test tool 130 is moved along a vertical direction until a tip of the shear test tool 130 is located at a predetermined shear height for the interconnect bond 120, e.g., H0 as shown in FIG. 1A. For example, in one embodiment, the shear test tool 130 may first be moved vertically down until the tip of the shear test tool 130 contacts the flat surface 111 on which the interconnect bond 120 is formed, then the shear test tool 130 is moved vertically up until the tip of the shear test tool 130 is located at the predetermined shear height. The predetermined shear height is typically one-third to half of a height of the interconnect bond 120 formed on the flat surface 111. Accordingly, the shearing path P which is spaced from the flat surface 111 for the shear test tool 130 to conduct shear test on the interconnect bond 120 is typically determined based on both the predetermined shear height and the degree of inclination of the surface on which the interconnect bond 120 is formed.

At Step 104, the shear test tool 130 is guided to move along the determined shearing path P to measure a shear force of the interconnect bond 120.

In a first embodiment of the invention, the height of each of the at least three different points on the flat surface 111 is determined by using an optical system.

Figure 2A:
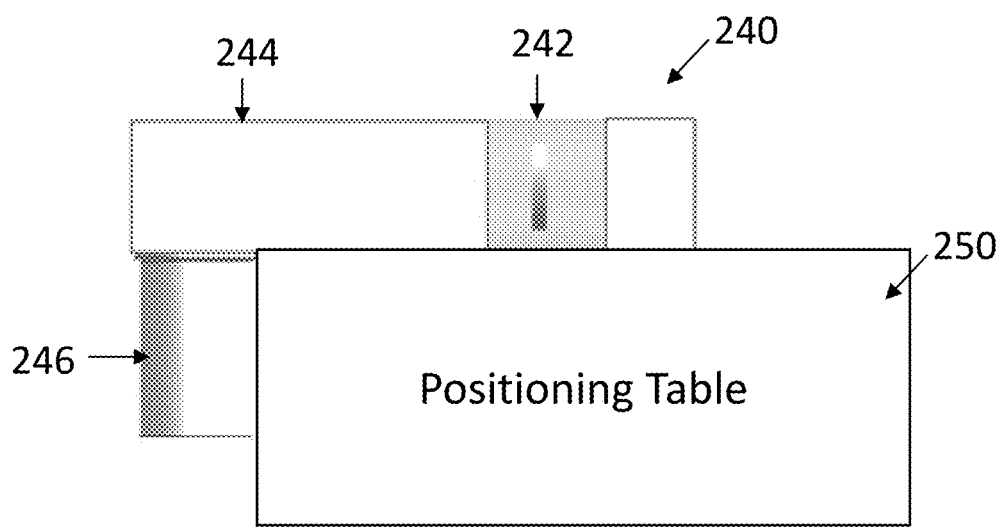
FIG. 2A is a schematic side view of an optical system used for determining a degree of inclination of the surface according to a first embodiment of the invention.
Figure 2B:
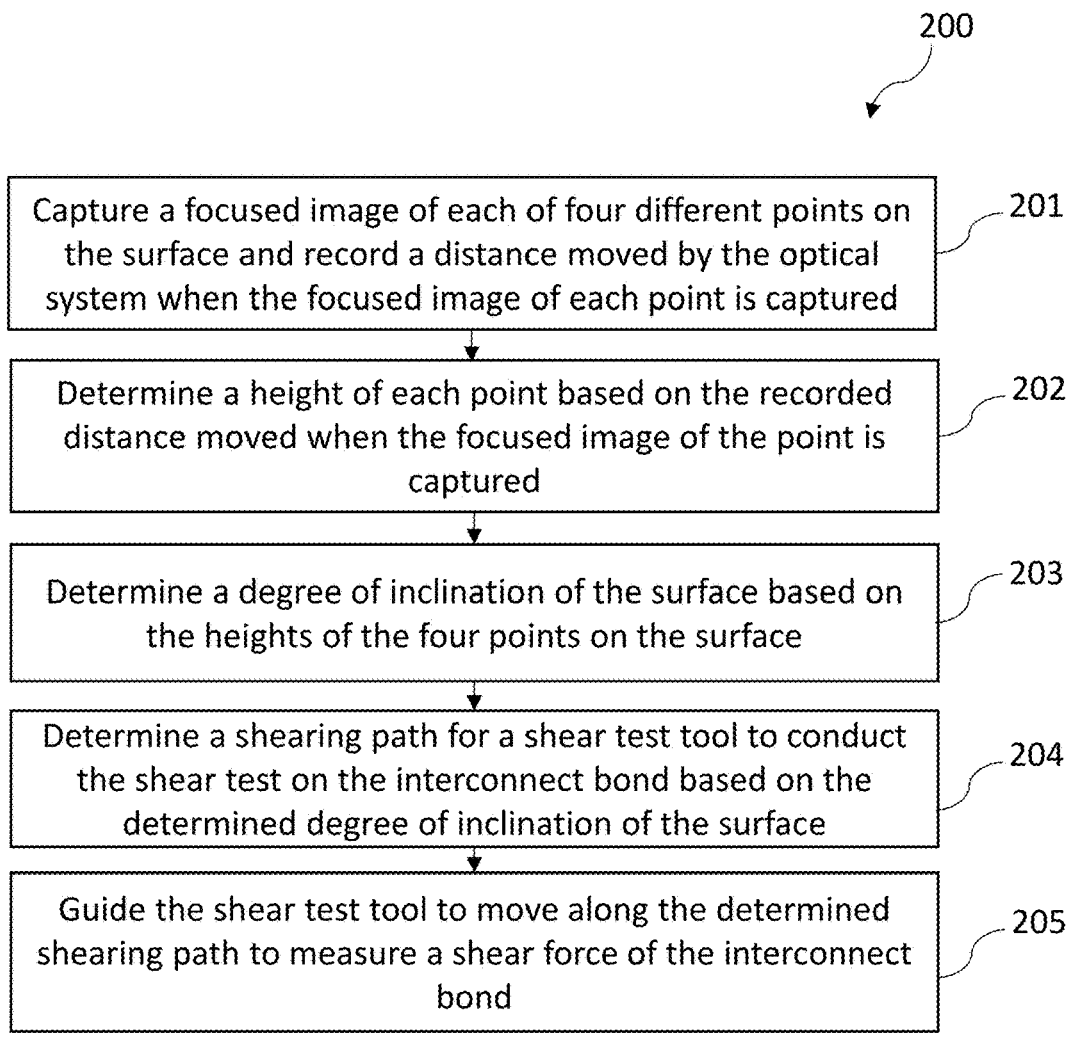
FIG. 2B is a flow chart illustrating a method for conducting a shear test on the interconnect bond formed on the surface according to the first embodiment.

FIG. 2A is a schematic side view of an optical system 240 used for determining the degree of inclination of the flat surface 111 according to the first embodiment of the invention. Referring to FIG. 2A, the optical system 240 is mounted on a movable positioning table 250 and includes a focusing lens 242, a tube lens 244, and an objective lens 246, which are connected to form a light transmission path. The movable positioning table 250 may be a movable XYZ positioning table. FIG. 2B is a flow chart illustrating a method 200 for conducting a shear test on the interconnect bond 120 formed on the flat surface 111 according to the first embodiment of the invention. In this embodiment, the four different points P1, P2, P3 and P4 as shown in FIG. 1C are selected to determine the degree of inclination of the flat surface 111.

At Step 201, a focused image of each of the four points P1, P2, P3 and P4 on the flat surface 111 is captured by the optical system 240 and a distance moved by the optical system 240 is recorded by a sensor operatively connected to the optical system 240 when the focused image of each of the points P1, P2, P3 and P4 is captured.

To capture the focused image of each point, the optical system 240 is sequentially moved by the positioning table 250 to four different XY positions above the flat surface 111 for capturing images of the four points P1, P2, P3 and P4 on the flat surface 111, before a focused image is obtained by moving at least one component of the optical system 240. In this embodiment, the optical system 240 may be moved by the positioning table 250 on a horizontal plane S1 at a height H1 above the flat surface 111 as shown in FIG. 1C. When the optical system 240 is moved to each of the four different positions, an autofocusing process is conducted by the optical system 240 by moving at least one component thereof, such as the entire optical system 240, the objective lens 246 only or the focusing lens 242 only, in order to capture the focused image of each point on the flat surface 111. When conducting the autofocusing process, an actuator which is operatively connected to the optical system 240 may be used to move the entire optical system 240, the objective lens 246 of the optical system 240, and/or the focusing lens 242 of the optical system 240 to conduct the autofocusing process. The actuator may include a piezoelectric motor, a linear motor and/or a programmable focus motor for moving the at least one component of the optical system 240.

If, during the autofocusing process, the entire optical system 240 or the objective lens 246 only is moved to capture the focused image of each point, the distance moved by the entire optical system 240 or the objective lens 246 along the Z-axis direction relative to the flat surface 111 may be recorded by a sensor (not shown) operatively connected to the optical system 240 or the objective lens 246. The sensor may be an encoder or a linear variable displacement transducer (LVDT).

If, during the autofocusing process, the focusing lens 242 is moved to capture the focused image of each point, the distance moved by the focusing lens 242 along a direction perpendicular to the axis of the objective lens 246, i.e., along the X-axis direction and/or the Y-axis direction, may be recorded by a sensor operatively connected to the focusing lens 242.

It should be noted that the movement direction of the focusing lens 242 for capturing the focused image of each point may be different in other embodiments since it depends on the arrangement of the focusing lens 242 in the optical system 240.

At Step 202, a height of each point, i.e., each of the points P1, P2, P3 and P4, is determined based on the recorded distance moved by the at least one component of the optical system 240 when the focused image of the point is captured.

In this embodiment, the height of each point may be calculated based on the recorded distance, an original height H1 of the optical system 240 before conducting the autofocusing process and a focus level of the optical system 240.

At Step 203, a degree of inclination of the flat surface 111 is determined based on the heights of the four points P1, P2, P3 and P4 on the flat surface 111.

At Step 204, a shearing path P for the shear test tool 130 to conduct the shear test on the interconnect bond 120 is determined based on the determined degree of inclination of the flat surface 111.

In this embodiment, before determining the shearing path P for the shear test tool 130 for conducting a shear test on the interconnect bond 120, the method may further include: moving the shear test tool 130 along a vertical direction until a tip of the shear test tool 130 is located at a predetermined shear height suitable for shearing the interconnect bond 120. Accordingly, the shearing path P for the shear test tool 130 to conduct shear test on the interconnect bond 120 is determined based on both the predetermined shear height and the degree of inclination of the flat surface 111 on which the interconnect bond 120 is formed.

At Step 205, the shear test tool 130 is guided to move along the determined shearing path P to measure a shear force of the interconnect bond 120.

In a second embodiment, the height of each of the at least three different points on the flat surface 111 is determined by using a test tool.

Figure 3A:
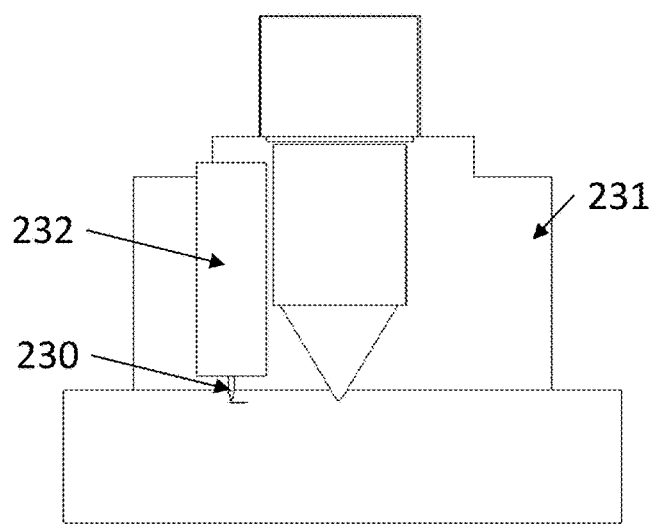
FIG. 3A is a schematic side view of a test tool for determining the degree of inclination of the surface on which the interconnect bond is formed according to a second embodiment of the invention.
Figure 3B:
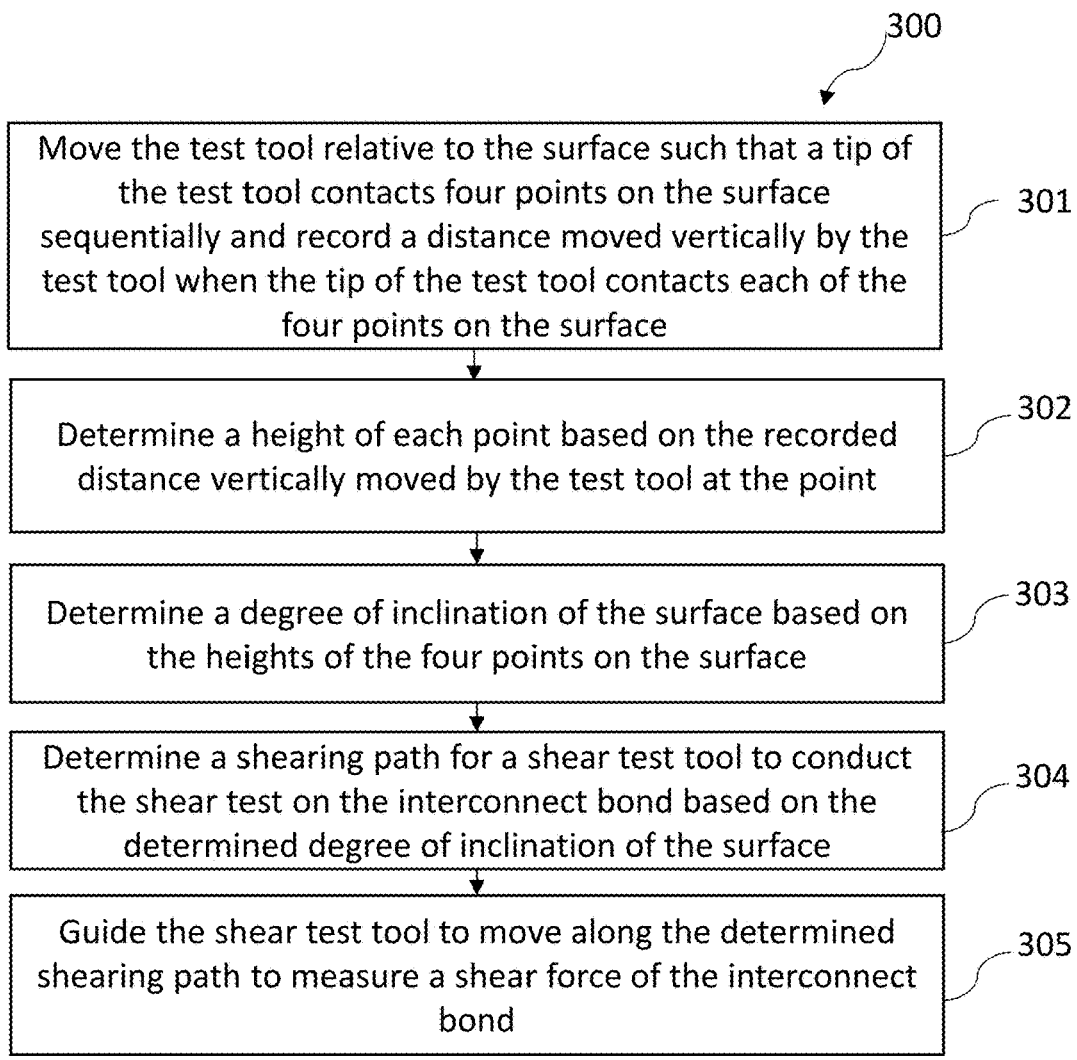
FIG. 3B is a flow chart illustrating a method for conducting a shear test on the interconnect bond formed on the surface according to the second embodiment.

FIG. 3A is a schematic side view of a test tool 230 for determining the degree of inclination of the flat surface 111 according to the second embodiment of the invention. As shown in FIG. 3A, the test tool 230 is mounted on a positioning table 231 and a sensor 232 is operatively connected to the test tool 230. FIG. 3B is a flow chart illustrating a method 300 for conducting a shear test on the interconnect bond 120 formed on the flat surface 111 according to the second embodiment. In this embodiment, the test tool 230 may include a shear test tool, e.g., the illustrated shear test tool 130, or a wire hook mounted on a positioning table.

At Step 301, the test tool 230 is moved by the positioning table 231 relative to the flat surface 111 such that a tip of the test tool 230 sequentially contacts all four points P1, P2, P3 and P4 on the flat surface 111, and a distance moved vertically by the test tool 230 is recorded by the sensor 232 when the tip of the test tool 230 contacts each of the four points on the flat surface 111.

At Step 302, a height of each of the points P1, P2, P3 and P4, is determined based on the recorded distance that is vertically moved by the test tool 230 at the point on the flat surface 111.

At Step 303, a degree of inclination of the flat surface 111 is determined based on the heights of the four points P1, P2, P3 and P4 on the flat surface 111.

At Step 304, a shearing path P for the shear test tool 130 to conduct the shear test on the interconnect bond 120 is determined based on the determined degree of inclination of the flat surface 111.

Similar to the first embodiment, before determining the shearing path P for the shear test tool 130, the shear test tool 130 may be moved along a vertical direction until a tip of the shear test tool 130 is located at a predetermined shear height, and accordingly, the shearing path P is determined based on both the predetermined shear height and the degree of inclination of the flat surface 111.

At Step 305, the shear test tool 130 is guided to move along the determined shearing path P to measure a shear force of the interconnect bond 120.

In a third embodiment, the degree of inclination of the flat surface 111 may be determined by using a chromatic confocal optical system. The difference between the third embodiment and the first embodiment is that a height profile of the entire flat surface 111 can be measured by the chromatic confocal optical system directly. An apparatus for measuring a height profile of a surface using chromatic confocal optical techniques is described in U.S. Pat. No. 8,654,352 entitled "Chromatic Confocal Scanning Apparatus", the disclosure of which is specifically incorporated by reference herein in its entirety.

Figure 4A:
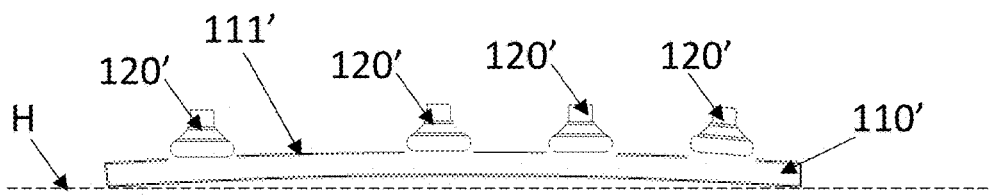
FIG. 4A is a schematic side view of a warped surface of an electronic device on which a plurality of interconnect bonds are formed.
Figure 4B:
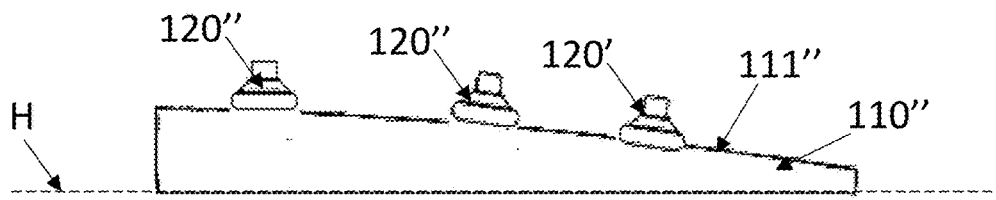
FIG. 4B is a schematic side view of a warped surface of an electronic device on which a plurality of interconnect bonds are formed, the warped surface being inclined relative to a horizontal plane.

In the embodiments shown in FIG. 1 to FIG. 3, the surface 111 on which the interconnect bond 120 is formed is a flat surface. However, in practice, the surface on which the interconnect bonds are formed may be warped or deformed so that it does not have a flat profile. FIG. 4A is a schematic side view of a warped surface 111' of an electronic device 110' on which a plurality of interconnect bonds 120' are formed. As shown in FIG. 4A, the warped surface 111' is curved relative to a horizontal plane H, i.e., the XY plane. FIG. 4B is a schematic side view of a warped surface 111" of an electronic device 110" on which a plurality of interconnect bonds 120" are formed, the warped surface being inclined relative to a horizontal plane H. The interconnect bonds 120', 120" are ball bonds which are provided for illustrative purposes only, and do not limit the scope of the invention.

Various methods for conducting a shear test on one or more of the interconnect bonds 120', 120" are provided in various embodiments of the invention. In these embodiments, a profile of the warped surface 111', 111" relative to the horizontal plane H is determined in order to determine a shearing path P that is at a substantially constant distance from the warped surface 111', 111", i.e., a curved shearing path P that is substantially parallel to the profile of the warped surface 111', 111", for conducting the shear test so as to obtain more accurate measurement results.

Figure 4C:
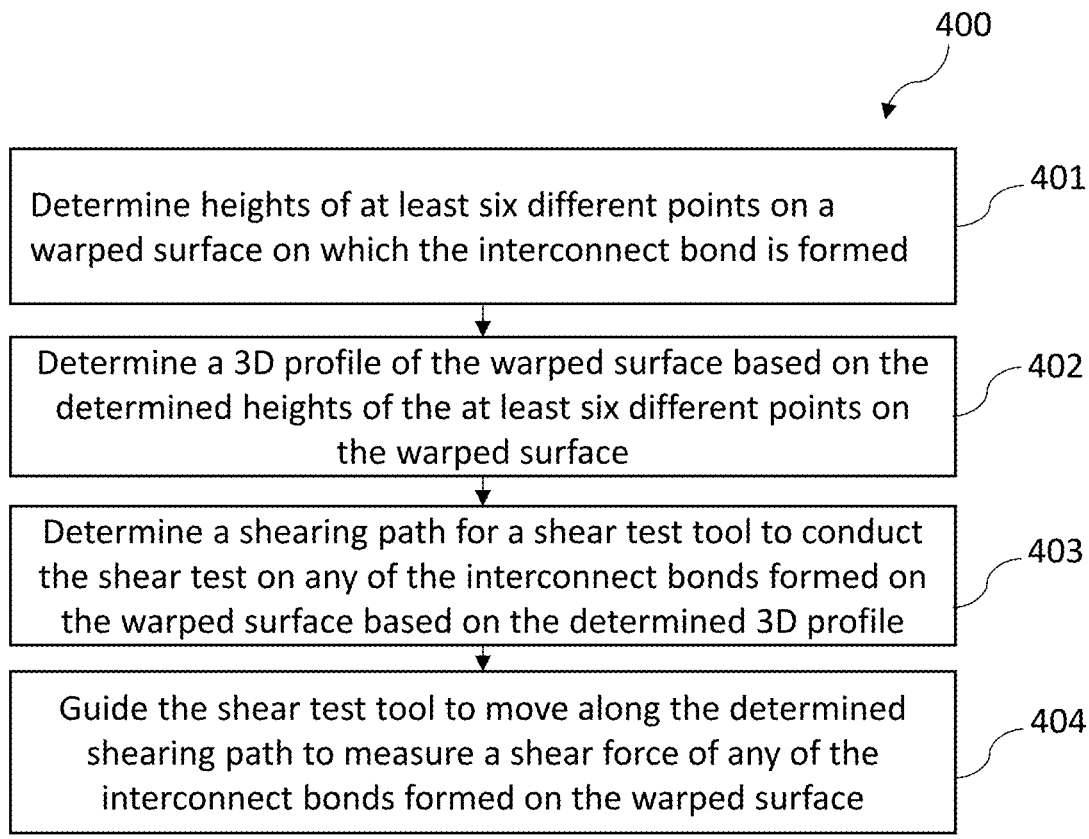
FIG. 4C is a flow chart illustrating a method for conducting a shear test on any of the interconnect bonds formed on the warped surface according to certain embodiments of the invention.

FIG. 4C is a flow chart illustrating a method 400 for conducting a shear test on any of the interconnect bonds 120', 120" formed on the warped surface 111', 111" according to certain embodiments of the invention.

At Step 401, heights of at least six different points on the surface 111', 111" are determined. The six different points may be selected from any portion on the warped surface 111', 111", e.g., an area around a target interconnect bond 120' to be tested.

At Step 402, a 3D profile of the warped surface 111', 111" is determined based on the heights of the at least six points on the warped surface 111', 111", since the warped surface is not flat and a height of each point may vary considerably relative to another point.

Once the heights of the at least six different points on the warped surface 111', 111" are determined, the 3D profile of the warped surface 111', 111" may be determined based on the three-dimensional coordinate values of the at least six different points, e.g., the three-dimensional coordinate values of six different points P1 to P6 in a three-dimensional Cartesian coordinate system. Specifically, the 3D profile of the warped surface 111', 111" can be defined by six parameters A, B, C, D, E and F in the equation (2) below, and the values of these parameters can be obtained based on the values of the coordinates of the six points P1 to P6.

$$Z=AX^2+BY^2+CXY+DX+EY+F \quad (2)$$

At Step 403, a shearing path P for the shear test tool 130 to conduct the shear test on any of the interconnect bonds 120', 120" is determined based on the 3D profile of the warped surface 111', 111". The shearing path P is at a substantially constant distance from the profile of the warped surface 111', 111".

At Step 404, the shear test tool 130 is guided to move along the determined shearing path P to measure a shear force of any of the interconnect bonds 120', 120".

The various methods for conducting a shear test on one or more of the interconnect bonds 120', 120" are essentially similar to the methods shown in FIG. 1 to FIG. 3 for conducting a shear test on the interconnect bond 120. The main difference is that the shearing path is determined based on a 3D profile of the warped surface 111', 111" which is calculated based on heights of at least six different points on the warped surface 111', 111". The methods for determining the heights of different points on the flat surface 111 according to the first to third embodiments of the invention can also be used to determine the heights of the at least six different points on the surface 111', 111". Specifically, the heights of the at least six different points on the surface 111', 111" may be determined by using an optical system according to the first embodiment, or by using a test tool according to the second embodiment, or by using a chromatic confocal optical system according to the third embodiment. These alternative embodiments will not be repeated in detail here.

Figure 5:
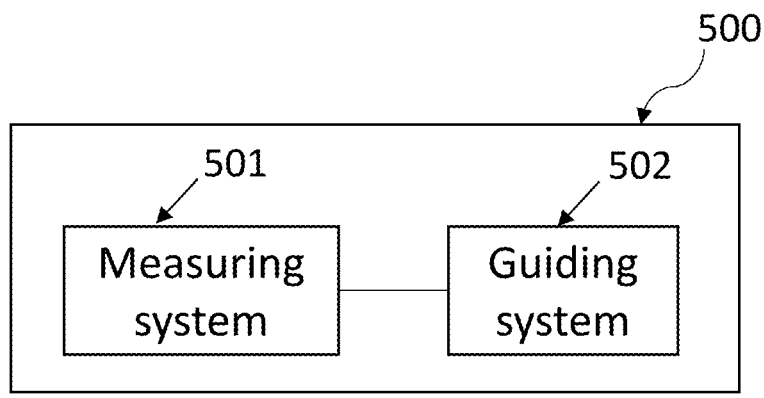
FIG. 5 is a schematic illustration of an apparatus for conducting a shear test on an interconnect bond formed on a surface of an electronic device according to certain embodiments of the invention.

Embodiments of the invention also provide an apparatus for conducting a shear test on an interconnect bond formed on a surface of an electronic device. FIG. 5 is a schematic illustration of an apparatus 500 according to certain embodiments of the invention. The apparatus 500 includes a measuring system 501 and a guiding system 502. The measuring system 501 is configured and operative to determine a profile of a surface on which an interconnect bond is formed so as to determine a shearing path which is at a substantially constant distance from the profile of the surface to conduct a shear test on the interconnect bond based on the determined profile of the surface. The guiding system 502 is configured to guide the shear test tool 130 to move along the determined shearing path to measure a shear force of the interconnect bond 120.

If the surface on which the interconnect bond is formed is flat, the measuring system 501 may be configured and operative to determine a height of each of at least three different points on the flat surface in order to determine the degree of inclination of the flat surface. The shearing path for the shear test tool to conduct a shear test on the interconnect bond is determined based on the determined degree of inclination of the flat surface. If the surface on which the interconnect bond is formed is warped, the measuring system may be configured and operative to determine heights of at least six different points on the warped surface in order to determine the 3D profile of the warped surface. The shearing path for the shear test tool to conduct a shearing test on the interconnect bond is determined based on the said 3D profile of the warped surface.

According to the first embodiment of the invention, the measuring system 501 may include an optical system 240 as shown in FIG. 2A, a sensor operatively connected to the optical system 240 and a processor in operative communication with the sensor. The optical system 240 is configured and operative to capture a focused image of each of the at least three different points on the flat surface 111 or at least six different points on the warped surface 111', 111". The sensor is configured and operative to record a distance moved by at least one component of the optical system 240 when the focused image of each of the multiple points is captured. The processor is configured and operative to determine the height of each of the multiple points based on the recorded distance moved by the at least one component of the optical system 240.

As shown in FIG. 2A, the optical system 240 is mounted on a movable positioning table 250 and is movable with the positioning table 250 to multiple positions above the surface 111, 111', 111" for capturing images of the at least three or six different points on the surface 111, 111', 111". It is also operative to conduct an autofocusing process at each of the multiple positions to capture the focused image of each of the multiple points on the surface 111, 111', 111".

The apparatus 500 further includes an actuator operatively connected to the optical system 240. The actuator is configured and operative to move the entire optical system 240, the objective lens 246 of the optical system 240 only, or the focusing lens 242 of the optical system 240 only to conduct the autofocusing process. The actuator may include a piezoelectric motor, a linear motor or a programmable focus motor. Specifically, the actuator may be configured and operative to move the entire optical system 240 or the objective lens 246 along a longitudinal axis of the objective lens 246, or to move the focusing lens 242 of the optical system 240 along a direction perpendicular to the longitudinal axis of the objective lens 246.

According to the second embodiment of the invention, the measuring system 501 may include a test tool 230 as shown in FIG. 3A, a sensor operatively connected to the test tool 230 and a processor in operative communication with the sensor. The test tool 230 is configured and operative to move relative to the surface 111, 111', 111" such that a tip of the test tool 230 contacts multiple different points on the surface 111, 111', 111". The sensor is configured to record a distance moved vertically by the test tool 230 when the tip of the test tool 230 is in contact with each of the multiple different points on the surface 111, 111', 111". The processor is configured to determine the height of each of the multiple points based on the recorded distance moved vertically by the test tool 230 at each of the multiple different points. The test tool 230 may include a shear test tool, e.g., the illustrated shear test tool 130, ora wire hook mounted on a positioning table.

In the third embodiment of the invention, the measuring system 501 may include a chromatic confocal optical system which is configured and operative to measure a height profile of the entire surface 111, 111', 111" directly.

As will be appreciated from the above description, the apparatus and method for conducting a shear test provided in the described embodiments of the invention utilize measuring instruments such as an optical system, a test tool or a chromatic confocal optical system to determine a profile of a surface on which at least one interconnect bond is formed so that an optimal shearing path P for the shear test tool to conduct a shear test on the at least one interconnect bond is determinable. As the determined shearing path P for the shear test tool is at a substantially constant distance from the profile of the surface on which the at least one interconnect bond is formed, a more accurate shear test on the at least one interconnect bond can be performed.

Although the present invention has been described in considerable detail with reference to certain embodiments, other embodiments are possible. Therefore, the spirit and scope of the appended claims should not be limited to the description of the embodiments contained herein.

The invention claimed is:

1. A method for conducting a shear test on an interconnect bond formed on a surface of an electronic device, the surface having a non-planar surface profile, the method comprising:
   determining the non-planar surface profile of the surface on which the interconnect bond is formed;
   based on the determined profile, determining a shearing path which is at a substantially constant distance from the non-planar surface profile of the surface for a shear test tool to conduct the shear test on the interconnect bond; and
   guiding the shear test tool to move along the determined shearing path to measure a shear force of the interconnect bond.

2. The method according to claim 1, wherein the step of determining the profile of the surface comprises measuring the profile of the surface with a chromatic confocal optical system.

3. The method according to claim 1, further comprising: moving the shear test tool along a vertical direction until a tip of the shear test tool is located at a predetermined shear height for the interconnect bond, and the step of determining the shearing path further comprises: determining the shearing path which is spaced from the surface by the predetermined shear height.

4. The method according to claim 1, further comprising determining heights of multiple points on the surface in order to determine the profile of the surface.

5. The method according to claim 4, wherein if the surface is flat, determining a height of each of at least three different points on the surface, or if the surface is warped, determining a height of each of at least of six different points on the surface.

6. The method according to claim 4, wherein the step of determining the heights of the multiple points on the surface comprises:
   moving the test tool relative to the surface such that a tip of the test tool contacts each of the multiple points on the surface;
   recording a distance moved vertically by the test tool with a sensor operatively connected to the test tool when the tip of the test tool is in contact with each of the multiple points on the surface; and
   determining the height of each of the multiple points on the surface based on the recorded distance vertically moved by the test tool at each of the multiple points on the surface.

7. The method according to claim 6, wherein the test tool includes a shear test tool or a wire hook mounted on a positioning table.

8. The method according to claim 4, wherein the step of determining the heights of multiple points on the surface comprises:
   capturing a focused image of each of the multiple points on the surface with an optical system;
   recording a distance moved by at least one component of the optical system with a sensor operatively connected to the optical system, when the focused image of each of the multiple points is captured; and
   determining the height of each of the multiple points based on the distance moved which has been recorded.

9. The method according to claim 8, wherein the step of capturing the focused image of each of the multiple points on the surface comprises:
   moving a positioning table on which the optical system is mounted so as to move the optical system to multiple positions above the surface for capturing images of the multiple points on the surface; and
   conducting an autofocusing process at each of the multiple positions with the optical system to capture the focused image of each of the multiple points on the surface.

10. The method according to claim 9, wherein the step of moving the entire optical system, the objective lens and/or the focusing lens of the optical system further comprises: moving the entire optical system or the objective lens along a longitudinal axis of the objective lens, or moving the focusing lens of the optical system along a direction perpendicular to the longitudinal axis of the objective lens.

11. The method according to claim 9, wherein the step of conducting the autofocusing process comprises:
   moving the whole optical system, an objective lens of the optical system, and/or a focusing lens of the optical system with an actuator operatively connected to the optical system to conduct the autofocusing process.

12. The method according to claim 11, wherein the actuator comprises at least one of a piezoelectric motor, a linear motor and a programmable focus motor.

13. An apparatus for conducting a shear test on an interconnect bond formed on a surface of an electronic device, the surface having a non-planar surface profile, the apparatus comprising:
   a measuring system configured and operative to determine the non-planar surface profile of the surface so as to determine a shearing path which is substantially constant distance from the non-planar surface profile of the surface for a shear test tool to conduct the shear test on the interconnect bond based on the determined non-planar surface profile of the surface; and
   a guiding system configured and operative to guide the shear test tool to move along the determined shearing path to measure a shear force of the interconnect bond.

14. The apparatus according to claim 13, wherein the measuring system comprises a chromatic confocal optics which is configured and operative to measure the profile of the surface.

15. The apparatus according to claim 13, wherein the measuring system is further configured and operative to determine heights of multiple points on the surface in order to determine the profile of the surface.

16. The apparatus according to claim 15, wherein the measuring system comprises a test tool which is configured and operative to be movable relative to the surface such that a tip of the test tool contacts each of multiple points on the surface, a sensor operatively connected to the test tool for recording a distance moved vertically by the test tool when the tip of the test tool is in contact with each of the multiple points on the surface, and a processor configured to determine the height of each of the multiple points on the surface based on the recorded distance moved vertically by the test tool at each of the multiple points on the surface.

17. The apparatus according to claim 16, wherein the test tool includes a shear test tool or a wire hook mounted on a positioning table.

18. The apparatus according to claim 15, wherein the measuring system comprises an optical system configured and operative to capture a focused image of each of the multiple points on the surface, a sensor operatively connected to the optical system for recording a distance moved by at least one component of the optical system when the focused image of each of the multiple points is captured; and a processor configured to determine the height of each of the multiple points based on the recorded distance moved.

19. The apparatus according to claim 18, wherein the optical system is mounted on a positioning table, the optical system being movable by the positioning table to multiple positions above the surface for capturing images of the multiple points on the surface, and the optical system being further operative to conduct an autofocusing process at each of the multiple positions to capture the focused image of each of the multiple points on the surface.

20. The apparatus according to claim 18, further comprising an actuator operatively connected to the optical system, the actuator being configured and operative to move the whole optical system, an objective lens of the optical system and/or a focusing lens of the optical system to conduct the autofocusing process.

21. The apparatus according to claim 20, wherein the actuator comprises at least one of a piezoelectric motor, a linear motor and a programmable focus motor.

22. The apparatus according to claim 21, wherein the actuator comprises a piezoelectric motor and/or a linear motor which is configured and operative to move the whole optical system or the objective lens along a longitudinal axis of the objective lens, or a programmable focusing motor which is configured and operative to move the focusing lens of the optical system along a direction perpendicular to the longitudinal axis of the objective lens.

* * * * *